(No Model.) 2 Sheets—Sheet 1.
A. MORAND.
METHOD OF AND APPARATUS FOR MANIPULATING COMMINUTED SUBSTANCES.
No. 338,430. Patented Mar. 23, 1886.
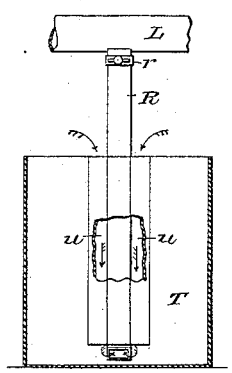
Fig. 10.
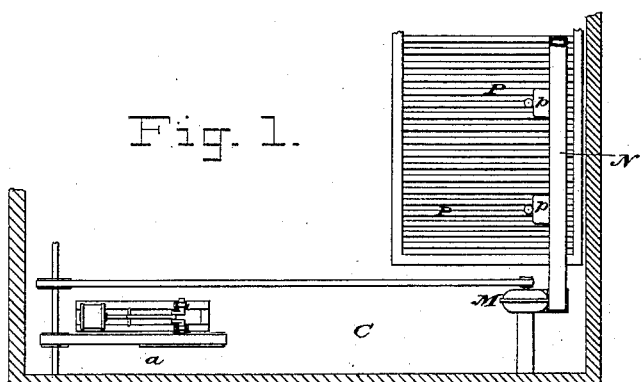
Fig. 1.
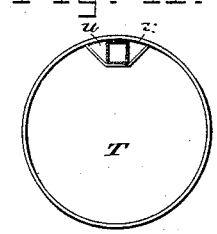
Fig. 11.
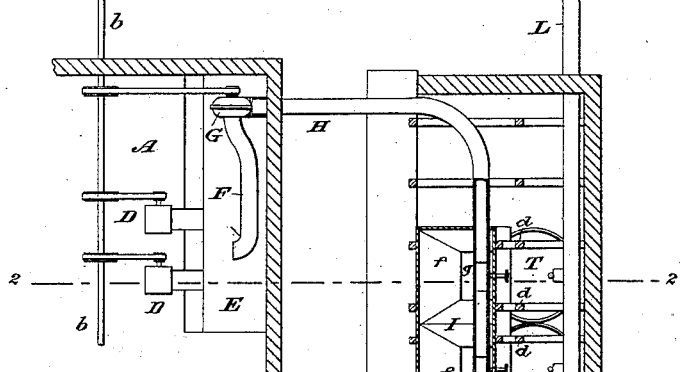
Fig. 2.
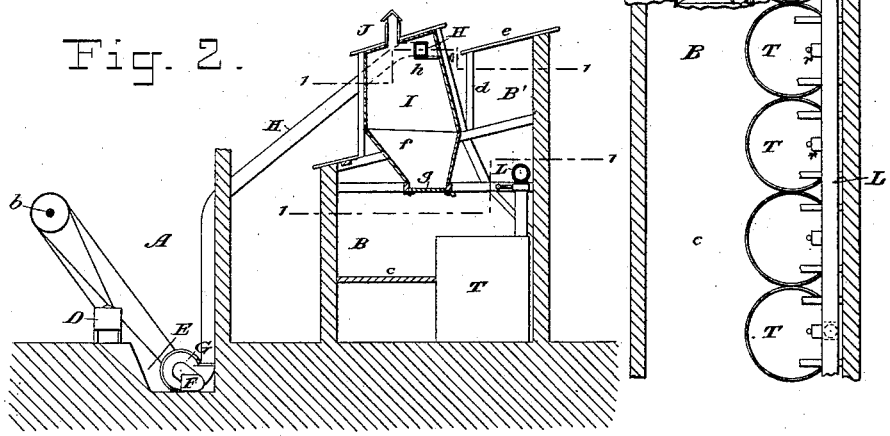
WITNESSES:
Geo. H. Fraser.
E. B. Bolton.
INVENTOR:
Augustus Morand
By his Attorneys,
Burke, Fraser Connett

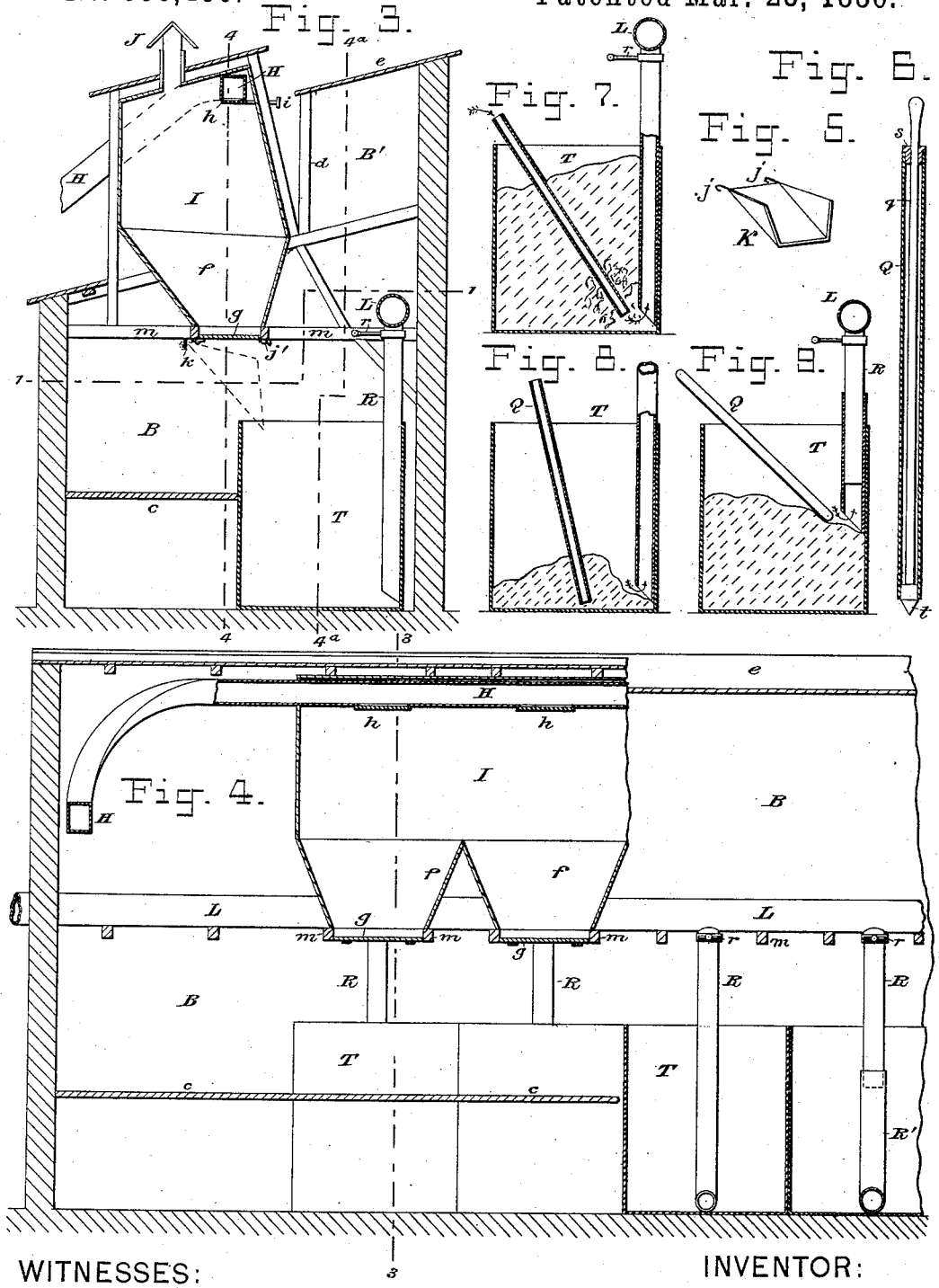

UNITED STATES PATENT OFFICE.

AUGUSTUS MORAND, OF PHILADELPHIA, PENNSYLVANIA.

METHOD OF AND APPARATUS FOR MANIPULATING COMMINUTED SUBSTANCES.

SPECIFICATION forming part of Letters Patent No. 338,430, dated March 23, 1886.

Application filed October 5, 1882. Renewed December 9, 1884. Serial No. 149,868. (No model.)

*To all whom it may concern:*

Be it known that I, AUGUSTUS MORAND, a citizen of the United States, residing at Philadelphia, (Germantown,) in the State of Pennsylvania, have invented certain new and useful Improvements in Apparatus for Manipulating and Conveying Comminuted Substances used in Manufacturing Extracts and for other Purposes, of which the following is a specification.

My invention was primarily designed for application to factories for manufacturing tannin extract from comminuted wood or bark, and I will describe it as adapted and applied to that purpose, although it is applicable to other industries.

In the manufacture of tannin extract as practiced by the best method known prior to my invention, the wood is cut up into small chips or slices, transversely of the grain, by cutting-machines driven by power, and from these machines it falls into a pit or depression in the floor some four or five feet deep, where it is permitted to accumulate in a pile. In another building opposite to the one containing the cutting-machines and pit is a row or series of large open-topped tanks about eight feet high, and in front of these is a floor or platform about four or five feet high. These tanks are filled and emptied successively, and whenever one requires to be filled a gang of men carry the chips from the pit to the tank in large baskets, descending into the pit, there filling their baskets, climbing thence up several steps to the level of the ground, walking thence across to the tank-house, climbing another series of steps to the platform, and then dumping their baskets successively into the tank, in which a man stands to stamp down and compact the chips. The labor of thus carrying the chips is severe, and this method of filling the tank is slow, expensive, and unsatisfactory. When the tank is full, a current of hot water and steam is caused to pass continuously through it, thus dissolving from the vegetable cells the tannin and other matters contained therein, and when the operation has been continued sufficiently long to effect this result the circulation is stopped and the water holding these matters in solution, is drawn off from the tank and carried through a pipe to another building, where it is delivered into a receiving-tank, whence it is drawn from time to time to be treated to the concluding processes of neutralization with alkali, filtration, clarification, concentration and barreling for shipment. As these processes have no connection with my present invention I will not further describe them. When the water is drawn off from the extracting-tank, there remains in the latter a heavy sodden mass of damp chips and particles of wood, hot and steaming, and partly dissolved or disintegrated by the action of the hot water, and to remove this a man must get into the tank and shovel out the spent material, after which it is carried in wheelbarrows to the boiler-room, dumped on racks or gratings, and there left to drain and become partially dry, when it is used as fuel in the furnaces.

My invention is designed to cheapen and accelerate these processes of manipulating and conveying the chips by utilizing for the purpose blasts of air from blowers or fans.

In the accompanying drawings, Figure 1 is a horizontal section of portions of the pit-house, the tank-house and the boiler-house, the tank-house being cut in the two planes denoted by the two lines 1 1 in Fig. 2. Fig. 2 is a transverse vertical section of the tank-house and a portion of the pit-house, cut in the plane of the line 2 2 in Fig. 1. Fig. 3 is a section of the tank-house similar to Fig. 2, but on a larger scale, and cut along the line 3 3 in Fig. 4. Fig. 4 is a longitudinal section of a portion of the tank-house, its left-hand portion being cut along the line 4 4 in Fig. 3 and its right-hand portion along the line 4ᵃ 4ᵃ therein. Fig. 5 is a perspective view of a detachable chute or spout. Fig. 6 is a longitudinal mid-section of a stirring-tool. Figs. 7 and 8 are vertical sections of one of the extracting-tanks, illustrating the operation of removing the spent material. Fig 9 is a similar section showing a modification. Fig. 10 is a vertical section of a tank looking from the front, and showing another modification, and Fig. 11 is a plan of the tank shown in Fig. 10.

Let A designate the pit-house, B the tank-house, and C the boiler-house, a portion only of each being shown.

The wood-cutting machines are indicated at D D, and the pit is shown at E.

I have shown a steam-engine, a, driving a line of shafting, b, from pulleys on which belts extend to and drive the cutters D D. I have made no effort to show the construction of the latter, their particular construction being immaterial to my invention. They are so arranged over or adjacent to the pit that the cuttings or chips as they fall from them will descend into the pit and may there accumulate. In the bottom of the pit is an air-pipe, F, leading to a blower or fan, G, and from the latter a delivering air-pipe, H, leads to the tank-house B. The blower G is or may be driven by a belt from the shaft b, and it acts to draw the air from the pit through the pipe F and to force it thence through the pipe H.

In the tank-house B is a row or series of digesting or extracting tanks, T T—usually ten or more in number—only a few of which are shown. Before these is a platform, c, on which the workmen stand who attend to the tanks. The tanks are shown as arranged against the rear wall of the building, and above them is a ventilator or ventilating-space, B', formed by open-work framing d d, supporting the upper roof, e. In front of this ventilator is a long bin or receptacle, I, extending the entire length of the row of tanks, and its lower portion divided into a series of hopper-shaped bottoms f f—one to each tank—and each hopper-bottom arranged opposite the corresponding one of the tanks, just above and somewhat in front thereof. Each hopper-bottom f terminates in an opening (shown as of rectangular shape) closed by a trap-door, g, which is hinged at its front side, and sustained by a bolt or button at its rear side, so that when unfastened it will drop downward and permit the contents of the hopper or bin to fall out. The air-pipe H extends through the bin I from end to end, and over each hopper-bottom it has an opening closed by a valve or slide, h, from which a rod or stem, i, extends outside the bin, in order that the valve may be opened or closed at will. A rod or cords may extend down to within reach of a workman on the platform c, for facility in operating the valve. Above the line I is a long continuous ventilator, J, or a series of ventilators, as preferred.

Fig. 5 shows a chute or spout, K, designed to be attached beneath any one of the hopper-bottoms f f. It consists of an inclined bottom and two sides, its rear end being open, and having hooks j j on its front end designed to engage staples or eyes k k, driven into or fixed to the supporting-beams m m. It is designed to be applied in the position shown in dotted lines in Fig. 3, by inserting its hooks j j into the eyes k k, and letting its rear end project over and rest on the top of the tank T. Other means of fastening it in place may be provided, but that just described answers well. The spout thus placed serves to direct the contents falling from the bin to the rear and into the tank T. The trap-door g drops into the spout when opened, the spout being made somewhat wider than the door to admit it. Into each tank T a pipe, R, projects, and all the pipes R R are branches of a horizontal air-pipe, L, extending longitudinally through the tank-house and entering the boiler-house C, where it connects with a blower, M, from which leads an air-pipe, N, which extends over a draining-rack or slatted platform or false bottom, P, which is slightly elevated above the floor. In each pipe R is a valve or slide, r, Fig. 10, by which communication through it can be stopped. There are several openings in the pipe N arranged at intervals over the platform P, and each is closed by a valve or slide, p. The blower M is shown as driven by a belt from the shaft b.

Fig. 6 shows a manipulating-tool consisting of a tube, Q, and a bar or handle, q, thrust inside of it. The bar q has a pointed plug, t, fixed to its lower end, which fits into and projects beyond the tube, as shown, and it has also a flanged disk, s, fixed near its upper end, which fits into and against the upper end of the tube, and is fastened to it in any suitable way, as by a bayonet-joint, so that the bar can be detached from and drawn out of the tube. The bar q might be of the diameter of the plug t throughout its length, except that it would be too cumbersome.

The operation is as follows: The cutting-machines D D operate, or may operate, continuously, and the chips or particles of wood fall from them into the pit E, where they may accumulate. The blower G being set in motion, one or more of the valves h in the pipe H are opened, whereupon air is drawn from the pit through the pipe F and forced through the pipe H into the bin I, whence it escapes by the ventilator J. An operator stands in or near the pit with a rake, and draws the chips toward the mouth or open end of the pipe F, where they are caught by the entering blast of air and borne through to the bin, into which they are discharged through the valve h, whereupon they fall to the bottom of the bin, while the air escapes freely at the top. This operation is continued until a sufficient quantity of chips has accumulated to fill the tank beneath that compartment of the bin, when that valve h is closed and some other valve is opened, thereby filling some other portion of the bin. Before each tank is ready to be filled the compartment of the bin above it must be filled. The spout K is then fastened beneath that compartment, as described, and the door g opened, whereupon the chips will fall from the bin into the tank, where a man may stand to stamp them down. Should the chips become clogged in the bin and cease to run out, they may be loosened by thrusting a bar into the hopper-bottom through the spout K and bottom doorway. Before opening the door g the blower G is stopped, as otherwise a current of air laden with dust and particles would blow down into the face of the man in the tank, and during the short time while the tank is being filled the chips accumulate in the pit. When the tank is full, the door $g$ is closed and fastened up, the spout K is removed, and the hot water or steam is caused to circulate through the material in the tank. The pipes for this purpose are not shown in the drawings, as they are of the usual arrangement and have no connection with my invention. The air-blast may be started again immediately, or whenever it becomes necessary. During the time that the digestion in the tanks proceeds, steam or vapor is continually rising therefrom, and with my arrangement it is drawn up into the ventilator B', back of the bin, whence it freely escapes, instead of enveloping the workmen on the platform $c$. With each tank, when the digesting process is completed, the water or solution is drawn off, leaving the material in the tank as free from liquid as possible. The valve $r$ is then opened and the blower M started, thereby causing a current of air to flow through the pipes R, L, and N, and to escape from the latter through one or other of the orifices over the platform P, according to which of the valves $p$ is open; but as the inlet end of the pipe R is deeply buried under a mass of wet and sodden material, it will usually be found necessary to make an artificial channel to admit air through this mass to the pipe. The tool shown in Fig. 6 answers this purpose, being thrust downward through the mass into the position shown in Fig. 7, whereupon the bar $q$ is drawn out, leaving the tube Q to conduct a current of air to the pipe R. The workman will continually stir the material with this tube, keeping the portion of the material adjacent to the entrance to the pipe R broken up, and directing the blast of air so that it shall catch and carry away such portions of the material as are thus detached from the mass. By thus continually stirring the material and pushing it toward the pipe R it is rapidly drawn into the pipe and carried away by the blast with much less labor and inconvenience than by the method heretofore employed. Fig. 8 shows the operation when nearly completed. The tube Q is then used more as a stirrer and to push the material toward the pipe R than as a tube to convey air to the pipe.

Instead of drawing the wet material out from the bottom of the mass, it may for some materials be preferable to draw from the top of the mass. This method is shown in Fig. 9, and to the right in Fig. 4. Outside of the fixed pipe R is a sliding pipe, R', free to move up or down. Normally this pipe is held in its highest position, but in emptying the tank it is permitted to descend as the mass of material in the tank decreases. The tube Q need not be used, but any bar or similar tool may be employed to stir the material and push it into the blast.

Instead of the telescopic pipe a flexible tube or hose may be used, and instead of having a separate pipe for each tank one such flexible hose may be made to reach into any one of several tanks. The nozzle of this hose may be held by the workman and directed to different parts of the tank, thus serving both to stir and carry up the material.

In Figs. 10 and 11 is shown a modified construction of the tank. The pipe R is inclosed in a shield which at each side forms an air duct or channel, $u$, down which the air passes to the entrance to the pipe R. It is necessary that the material be stirred and pushed into the blast; but this may be done by any rod or stick, the tube Q not being necessary. On the platform P the material is drained and permitted to dry, and when sufficiently dry it may be removed and used as fuel or for other purposes.

Although I have described my invention as applied to a tannin-extract factory, it may be adapted to many other establishments where tanks are to be filled or emptied.

It must not be inferred from my detailed description of my apparatus that my invention is limited to the details of construction or arrangement set forth, as it is, in fact, susceptible of considerable modification without departing from its essential features. For instance, instead of one long bin, I, having a number of hopper-bottoms, a number of separate bins may be employed to similar effect, one bin being filled by the blast while another is being emptied into the tank T.

I make no claim in this application to any method of manipulating or conveying the comminuted substances, nor to any process of comminuting or granulating; but in so far as any such process is herein described, I hereby reserve it to be claimed in a pending application of mine filed August 17, 1885, Serial No. 174,557.

I claim as my invention—

1. The combination, with a series of tanks to be filled with comminuted substances, of a cutter for comminuting the material, a receptacle for the comminuted material, a blower, a suction-pipe leading from said receptacle to the blower, and a delivery-pipe leading thence over the tanks, and provided with valved openings corresponding with the respective tanks, substantially as set forth.

2. The combination of a tank to be filled with a comminuted material, a bin arranged above said tank and capable of being emptied thereinto, a pit or accumulating-receptacle for the material, a blower, a suction-pipe leading from said accumulating-receptacle to said blower, a delivery-pipe leading from said blower to said bin, and provision for the free escape of the air from the upper part of said bin, substantially as set forth.

3. The combination of a series of tanks, a bin or series of bins or compartments thereof arranged above said tanks, a series of openings in the bottom or bottoms thereof corresponding to said tanks and for delivery thereto, a pit or accumulating-receptacle, a blower, a suction-pipe leading from said accumulating-receptacle to said blower, a delivery-pipe leading from said blower into said bin or bins, a series of valved discharge-openings in said pipe within said bin or bins, and an aperture for escape of air from the upper part of said bin or bins, substantially as set forth.

4. The combination of blower G, pipe H, having valved openings $h\ h$, bin I, having hopper-bottoms $f\ f$ and trap-doors $g\ g$, and tanks T T, substantially as set forth.

5. The combination of bin I, hopper-bottom $f$ thereof, door $g$, spout K, and tank T, substantially as set forth.

6. A tank-house, B, constructed with ventilator B', in combination with a row of tanks, T T, beneath said ventilator, and a continuous bin or series of bins, I, arranged in front of said ventilator and above said tanks, substantially as and for the purposes set forth.

7. The combination of a tank, an air-pipe extending thereinto opening at or near its bottom, and leading thence to a blower, the said blower, and an air tube or duct leading from the top of said tank down into the same to near the opening of said pipe, substantially as set forth.

In witness whereof I have hereunto signed my name in the presence of two subscribing witnesses.

AUGS. MORAND.

Witnesses:
ARTHUR C. FRASER,
HENRY CONNETT.